United States Patent
Maynard

(10) Patent No.: US 6,400,452 B1
(45) Date of Patent: *Jun. 4, 2002

(54) THREE DIMENSIONAL LASER CONTROL AND TRACKING SYSTEM

(75) Inventor: Kurtis L. Maynard, Gainesville, GA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/798,201

(22) Filed: Mar. 2, 2001

Related U.S. Application Data

(63) Continuation of application No. 09/551,988, filed on Apr. 15, 2000, now Pat. No. 6,198,528, which is a continuation of application No. 09/083,404, filed on May 22, 1998, now abandoned.

(51) Int. Cl.[7] .......................... G01B 11/26; G01S 3/02; H04B 10/00
(52) U.S. Cl. .................... 356/141.1; 342/457; 342/463; 359/157; 359/170
(58) Field of Search ........................ 356/141.1; 342/457, 342/463; 359/155, 157, 169, 170

(56) References Cited

U.S. PATENT DOCUMENTS

| | | | |
|---|---|---|---|
| 3,893,772 A | * | 7/1975 | Tilly et al. |
| 4,131,791 A | * | 12/1978 | Lego, Jr. |
| 4,227,261 A | * | 10/1980 | Robertsson |
| 4,983,021 A | * | 1/1991 | Fergason |
| 5,100,229 A | * | 3/1992 | Lundberg et al. |
| 5,137,354 A | * | 8/1992 | De Vos et al. |
| 5,294,970 A | * | 3/1994 | Dornbusch et al. |
| 5,317,442 A | * | 5/1994 | Sharp et al. |

* cited by examiner

*Primary Examiner*—Stephen C. Buczinski
(74) *Attorney, Agent, or Firm*—Boris G. Tankhilevich

(57) ABSTRACT

A three dimensional laser tracking and control system is disclosed. The system includes a laser beacon generating a three dimensional rotating and scanning laser beam that covers a three-dimensional area. Each mobile unit has identification number (ID) and is equipped with a intelligent reflector (IR). Each mobile unit uses its intelligent reflector (IR) to communicate to the signal system its ID and the time of illumination by the laser beam. The signal system calculates the three dimensional coordinates for each mobile unit and communicates the positional data back to each mobile unit using the same laser beam during the subsequent rotation cycles.

4 Claims, 4 Drawing Sheets

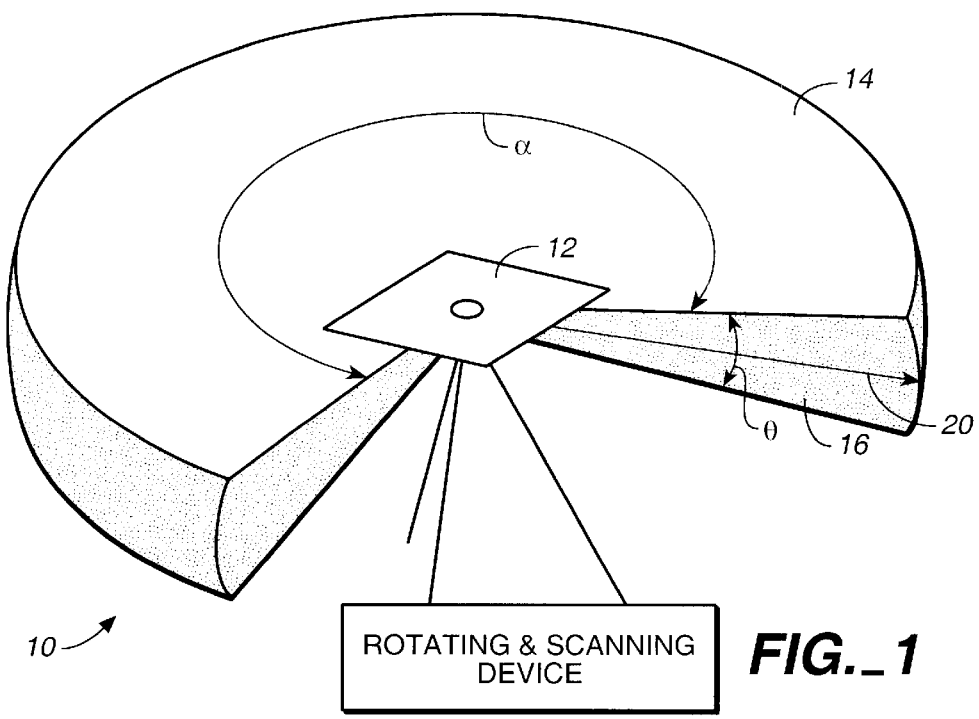
FIG._1
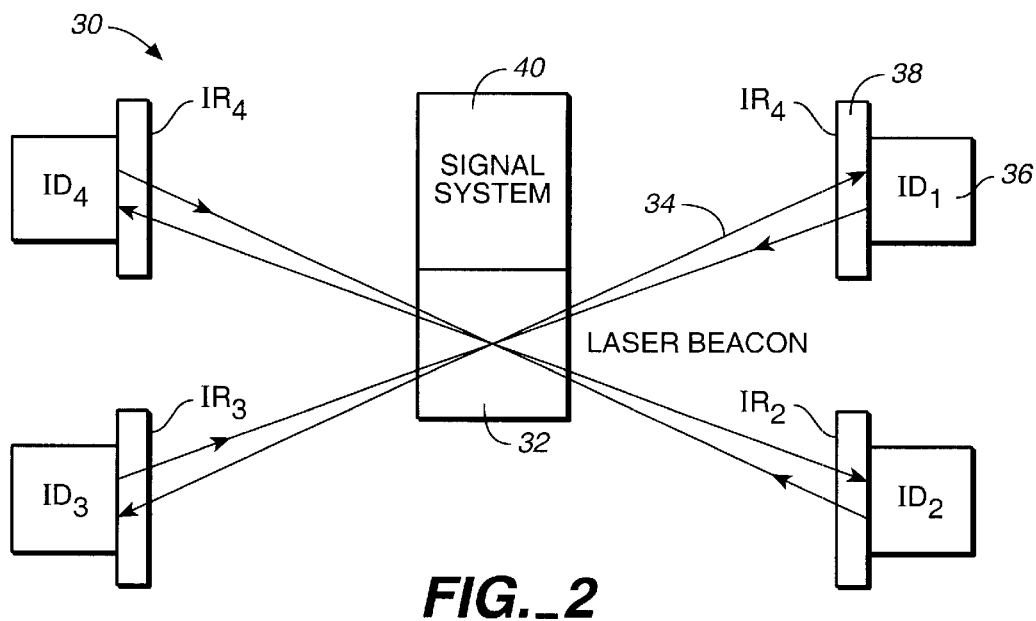
FIG._2

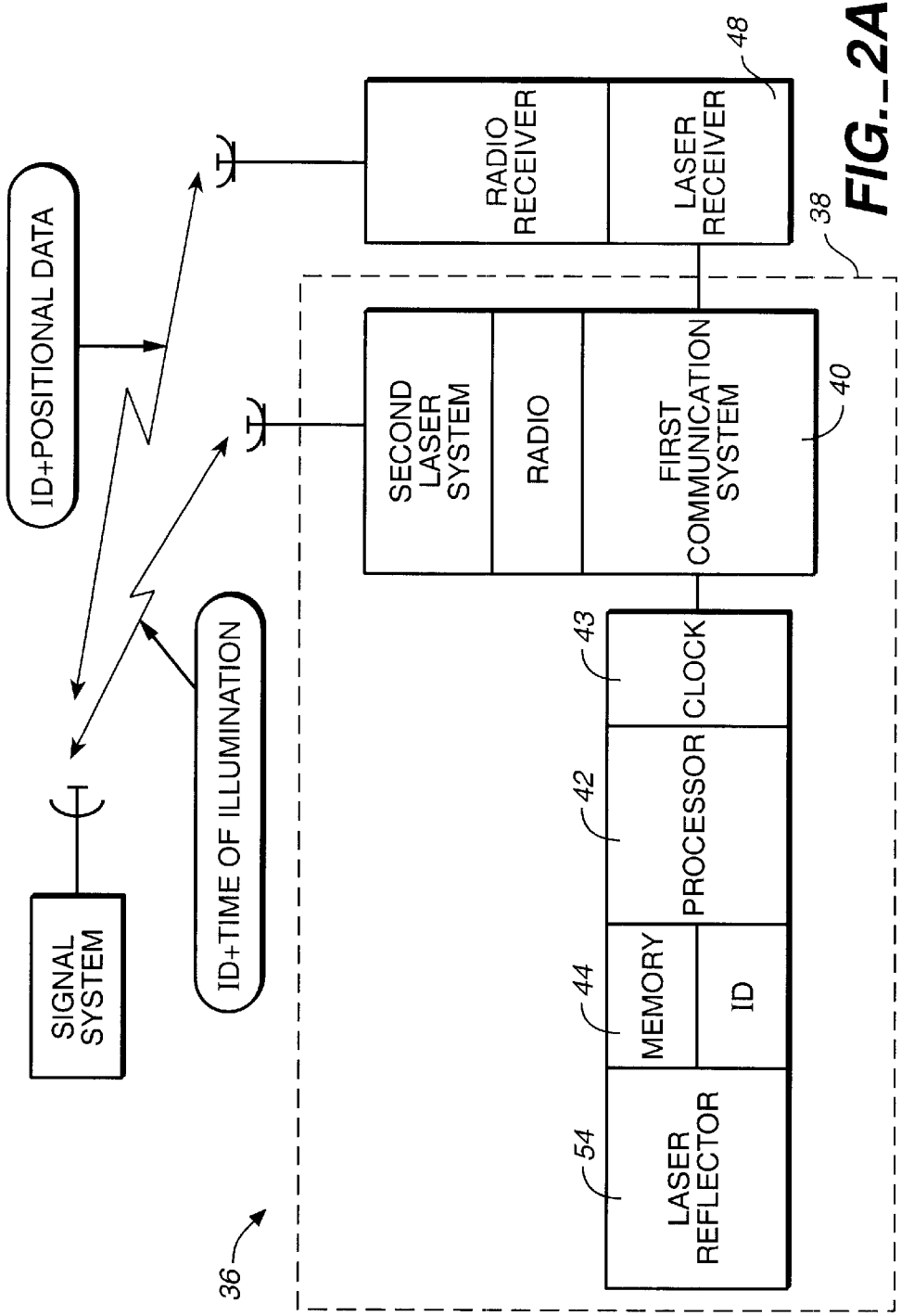

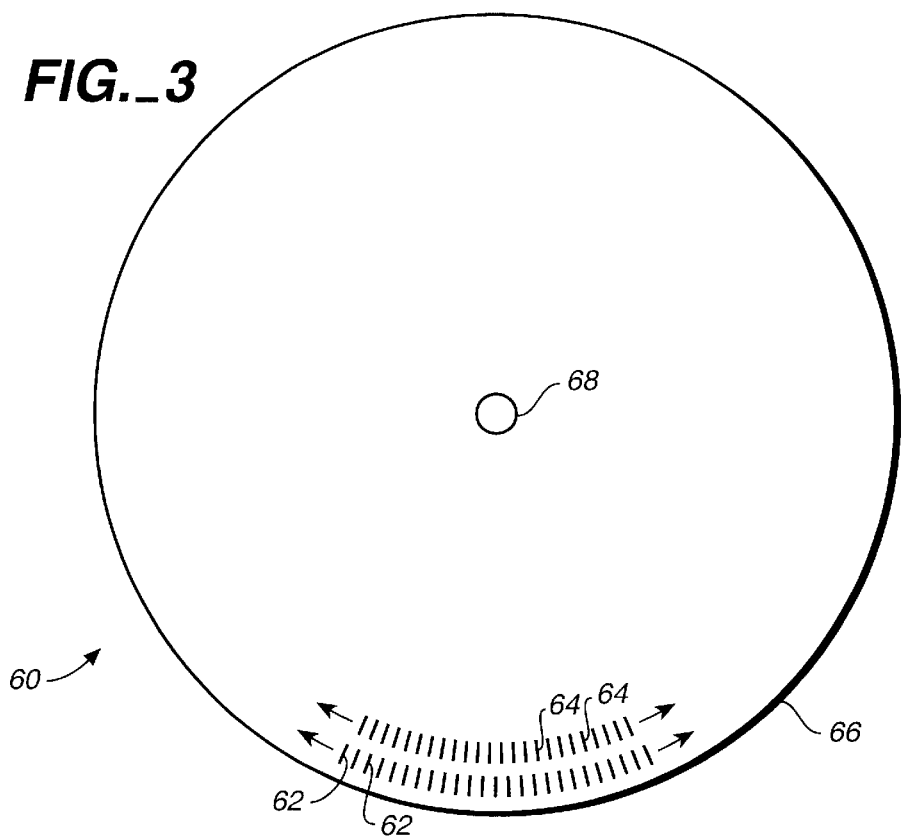
FIG._3
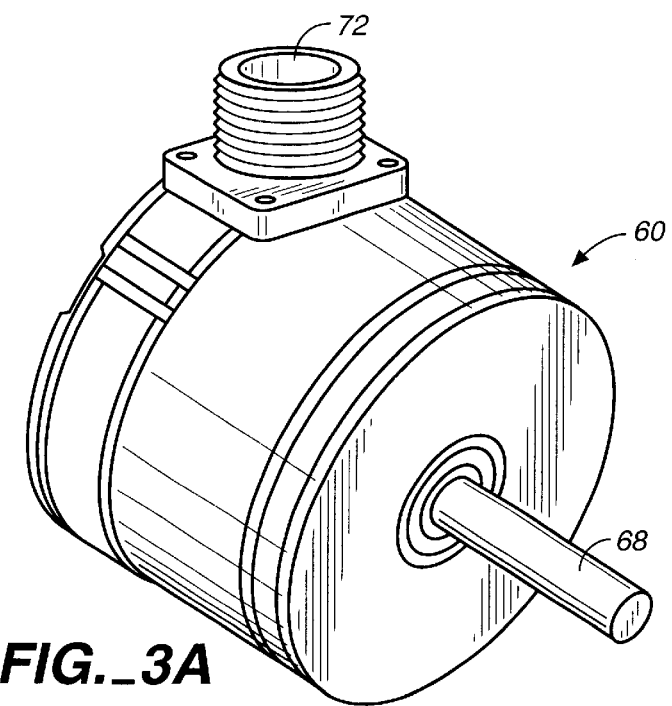
FIG._3A

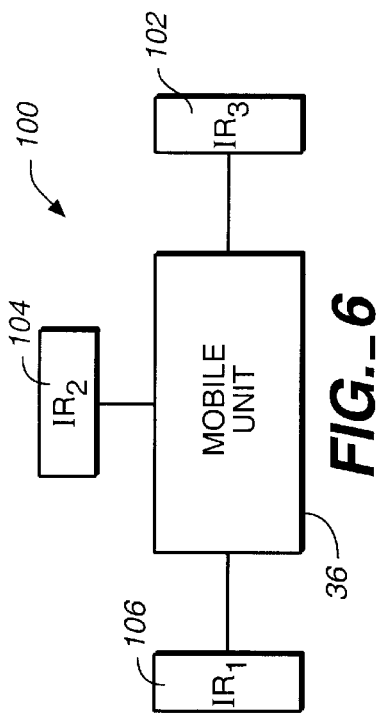
FIG._4
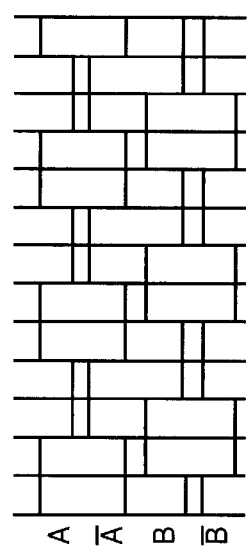
FIG._6
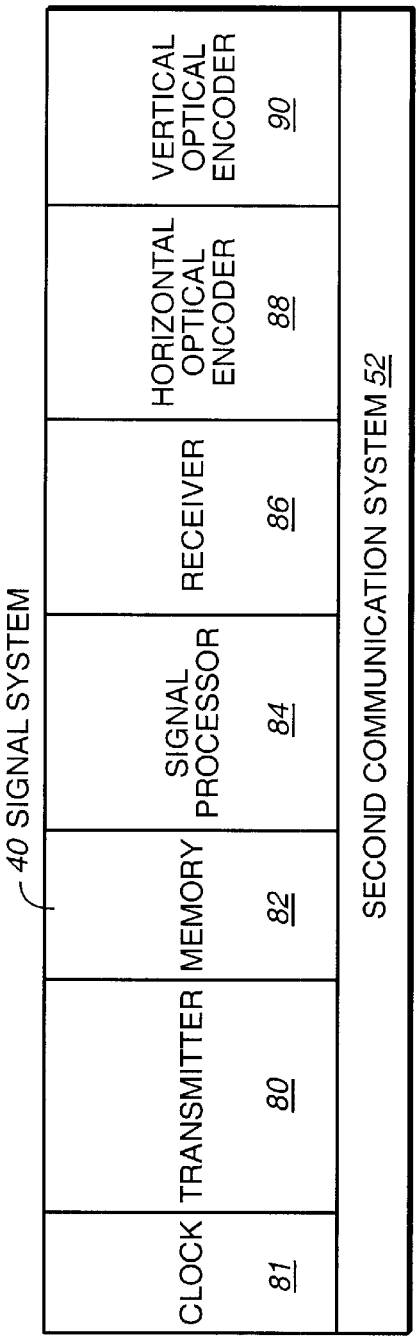
FIG._5

THREE DIMENSIONAL LASER CONTROL AND TRACKING SYSTEM

This is the continuation of the U.S. patent application No. 09/551,988, filed on Apr. 15, 2000, now Pat. No. 6,198,528, and entitled "LASER-BASED THREE DIMENSIONAL TRACKING SYSTEM", which is the continuation of the U.S. patent application No. 09/083,404, filed on May 22, 1998, now abandoned, and entitled "THREE DIMENSIONAL MULTI-UNIT LASER CONTROL AND TRACKING SYSTEM".

FIELD OF THE INVENTION

The current invention is in the field of the position tracking and control systems.

DESCRIPTION OF THE BACKGROUND ART

In the available art of position tracking and control systems, the three dimensional position coordinates of the mobile object can be determined in a variety of ways. In recent years, the global positioning satellite (GPS) receivers and the receivers that use the alternative satellite systems, like GLONASS system, came of age and began to proliferate widely. The autonomous navigational system that includes the satellite receiver and a navigational computer can achieve the 10-meter level of accuracy in the position determination of the mobile object.

The differential navigation systems that utilize the differential corrections in addition to the satellite signals can determine the positional information with the meter-range accuracy. The real-time kinematic (RTK) GPS systems that are capable of utilizing in real time not only code abut also the carrier information transmitted from satellites can achieve the centimeter level of accuracy in the position determination of the mobile object.

However, the millimeter level of accuracy is still beyond the reach of the satellite navigational systems. The prior art rotating laser-based systems can define the plane level (Z-plane) with a millimeter level of accuracy. However, these prior art laser-based systems can not be used for the purposes of three dimensional navigation of mobile objects because they are configured to determine only one (Z) coordinate of a mobile object. What is needed is the laser-based system that can be used for the purposes of precise three dimensional navigation of a mobile object.

SUMMARY OF THE INVENTION

To address the shortcomings of the available art, the present invention provides a method and a system for precise laser-based three dimensional navigation and tracking of a mobile object.

One aspect of the present invention is directed to a three dimensional multi-unit laser control and tracking system. In one embodiment, the system comprises: (1) a light beacon generating a rotating beam of laser light to cover a three-dimensional site area, and (2) a signal system capable of detecting the laser beam reflected from at least one mobile unit. The signal system generates at least one communication signal including an ID and a positional information of each mobile unit and transmits each communication signal to each mobile unit. Each mobile unit by matching its ID and the timing of reflection of the laser beam is capable to recover its positional information from one such communication signal.

In an alternative embodiment, a three dimensional multi-unit laser control and tracking system comprises: (1) a light beacon generating a rotating and scanning beam of laser light to cover a three-dimensional site area, (2) at least one mobile unit, (3) a signal system capable of detecting the laser beam reflected from each mobile unit, and (4) at least one receiver mounted on each mobile unit. Each mobile unit provides its identification number (ID) upon sensing and reflecting the incoming laser beam. The signal system generates at least one communication signal including an ID and a positional information of one mobile unit and transmits this information to each mobile unit. Each mobile unit by matching its ID and the timing of reflection of the laser beam is capable to recover its positional information from one such communication signal.

In the preferred embodiment, the mobile unit further includes an intelligent reflector including a memory chip and a processor. The memory chip includes the ID of one mobile unit. The processor determines the exact time when the laser beam illuminated the intelligent reflector. In one embodiment, the intelligent reflector transmits the ID of the mobile unit and the time of illumination to the signal system using the incoming rotating laser beam.

In an alternative embodiment, the signal system further includes a first communication system used to transmit the ID and the time of illumination by the rotating laser beam from each mobile unit to the signal system. The first communication system includes: (1) a laser system generating a second laser beam utilized to transmit the ID and the time of illumination from each mobile unit to the signal system, or a radio communication system used for the same purposes. In the preferred embodiment, the signal system further includes a signal processor. The signal processor is utilized to calculate the three-dimensional coordinates for each mobile unit by determining the angular coordinates of the laser beam reflected from each mobile unit, by determining the distance between the light beacon and each mobile unit, and by matching the positional information for each mobile unit with the ID and the time of illumination by the rotating laser beam.

In the preferred embodiment, the signal system further includes a second communication system used to transmit to each mobile unit its positional information. The second communication system can include a laser source generating a third laser beam used to transmit the positional information to each mobile unit, or a radio communication system used for the same purposes.

In one embodiment, the laser beacon further includes a laser source, a scanning system for scanning the laser source within a vertical plane for generating a laser beam, and a rotating system for rotating the laser beam within the horizontal plane. The scanning system as well as the rotating system can be implemented using the mechanical and/or optical means.

Another aspect of the present invention is directed to a method for control and tracking at least one mobile unit employing a three dimensional laser system. The method comprises the following steps: (1) generating a rotating beam of laser light capable of covering a three-dimensional site area; (2) detecting the laser beam being sequentially reflected from each mobile unit; (3) receiving the ID and the time of illumination of each mobile unit by the signal system; (4) generating the positional information for each mobile unit; (5) matching the positional information, ID, and the time of illumination for each mobile unit; and (6) communicating to each mobile unit its positional information.

BRIEF DESCRIPTION OF THE DRAWINGS.

The aforementioned advantages of the present invention as well as additional advantages thereof will be more clearly understood hereinafter as a result of a detailed description of a preferred embodiment of the invention when taken in conjunction with the following drawings.

FIG. 1 depicts a light beacon that emits a rotating and scanning laser beam that covers a three dimensional area.

FIG. 2 shows a three dimensional multi-unit laser control and tracking system.

FIG. 2A is an illustration of the mobile unit equipped with the intelligent laser reflector (IR), communication system, and a receiver for receiving the positional information from the signal system.

FIG. 3 illustrates a conventional rotary encoder used for measuring the angular coordinates of mobile units.

FIG. 3A depicts an encoder of FIG. 3 including a shaft and an output terminal.

FIG. 4 shows an example of output produced by the encoder of FIG. 3.

FIG. 5 depicts a signal system.

FIG. 6 illustrates a mobile unit including three intelligent laser reflectors.

DETAILED DESCRIPTION OF THE PREFERRED AND ALTERNATIVE EMBODIMENTS

The present invention can be best understood by focusing on a laser beacon (10), as depicted in FIG. 1, that generates a laser beam (20) covering the three-dimensional area (10). The area (10) has a vertical (16) angular window θ<180 degrees and a horizontal (12) angular window α=360 degrees. The laser beam (20) of FIG. 1 can be generated using a rotating laser system with a scanning feature.

Rotating lasers were introduced about twenty-five years ago. The rotating laser system can be implemented when a laser spins in the horizontal plane, or Z-plane, and provide an accurate reference plane with millimeter-precision. The rotating laser emits a laser beam. However, to detect and get benefit of the rotating laser beam, the potential user has to be located within vertical range. The user has to be equipped with the laser receiver capable of receiving the rotating laser beam. The rotating laser beam can be rotated mechanically or optically. In the mechanic embodiment, the motor physically rotates the laser and accordingly the laser beam. In the optical embodiment, the mirror rotates in such a way that the physically non-rotating laser emits the rotating laser beam.

A fan (scan) laser system generates a continuously scanning laser beam in vertical plane within a certain angle window. The scanning laser beam can be scanned mechanically or optically. In the mechanic embodiment, the motor physically scans the laser and accordingly the laser beam. In the optical embodiment, the mirror scans in such a way that the physically non-scanning laser emits the scanning laser beam. The scanning laser system can be used to measure the angular coordinates and distance from the laser scan to the target. One application is a robotics vision, another application is a collision avoidance system. The SchwartzElectro Optics (SEO), Orlando, Fla., manufactures scanning (fan) laser systems. Laser Systems, Inc., located in Pleasanton, Calif., manufactures a smart rotating laser system RL-S1A with a scanning feature. The user can receive the laser beam with the SmartCard target and draw the scan to any width for optimum beam brightness. This laser system has 633 nm visible diode as a laser source. The horizontal self leveling range is (+/−) 10 arc minutes. The vertical self leveling range is also (+/−) 10 arc minutes. The horizontal accuracy is (+/−) 15 arc seconds. The vertical accuracy is (+/−) 20 arc seconds. Operating range (diameter) with scanning target is 200 ft (60 m), with LS-50B receiver is 100 ft (300 m).

A three dimensional multi-unit laser control and tracking system (30) of FIG. 2 is the subject of the present invention. In one embodiment, the system (30) comprises a light beacon (32) and a signal system (40). The light beacon generates a rotating beam of laser light (34) that covers a three-dimensional site area. There are multiple mobile units (36) that can be located in the covered three dimensional area. Each mobile unit (36) has its own identification number (ID). Each mobile unit (36) includes an intelligent reflector (38) that can provide the reflected laser beam with the identification number (ID) of the mobile unit and the time of reflection. (See discussion below). The signal system (40) is capable of detection the rotating and scanning laser beam every time when the laser beam is reflected from each mobile unit (36) located in the covered three dimensional area. The signal system (40) detects the reflected from each mobile unit laser beam that includes the ID of the mobile unit and the time of reflection. The signal system also is capable of determining the positional information of each mobile unit at the time when the laser beam was reflected from the mobile unit. (See discussion below). The signal system generates a number of communication signals and transmits to each mobile unit one communication signal designated for this unit that includes the ID of this unit and the positional information for this unit at the time of the laser beam reflection. Each mobile unit is preferably equipped with the receiver capable of reception the communication signal designated for this particular unit that includes the ID for this unit and its positional information at the time of the laser beam reflection.

In another embodiment, the present invention discloses a three dimensional multi-unit laser control and tracking system that includes: (1) a light beacon generating a rotating beam of laser light to cover a three-dimensional site area; (2) at least one mobile unit located in the three-dimensional site area, each mobile unit being equipped with the intelligent reflector and the receiver, and (3) a signal system. Yet, in more embodiment, the present invention discloses a position determination system that employs a three dimensional laser system. The position determination system includes: (1) a mobile unit having (2) an intelligent reflector capable of communicating its identification number (ID) and the time of illumination by a three dimensional laser beam to a processing system, and including (3) a receiver that is capable of reception from the processing system the communication signal designated for this particular mobile unit that includes its three dimensional positional information.

FIG. 2A depicts a mobile unit (36) equipped with an intelligent reflector (IR) (38) and a receiver (48). The intelligent reflector (IR) (38) includes a standard laser reflector (54), a memory unit (44) that stores the identification number (ID) of the mobile unit, and a processor (42). The standard laser reflector reflects the light (or infrared beam) back to the laser beacon. The standard laser reflector should have the following properties: (1) good reflectivity, (2) complete illumination of the receiver optics, and (3) no change direction of the emerging rays through small movements of the reflecting device, thus rendering a continuous alignment unnecessary. The standard laser reflector can comprise: (1) a plane surface mirror, (2) a spherical reflector, (3) a solid glass prism reflector (corner cube reflector), (4) hollow corner cube reflector, (5) acrylic retroreflector, or (6) a reflective sheeting. When the laser beam illuminates the IR, the processor utilizes its clock (43) to determine the time of illumination.

The intelligent reflector (IR) also includes a first communication system (40). In one embodiment, the first communication system includes a first radio communication system used to transmit the ID and the time of illumination from the mobile unit to the signal system. In another embodiment, the first communication system includes the processor (42) and the second laser system that are used for generating a modulation signal that includes the ID of the mobile unit and the time of illumination by the rotating and scanning laser beam.

The modulation and demodulation of the laser beam can be easily achieved. Indeed, it is well known to those skilled in the art , that there are infrared emitting and lasing diodes that can be easily modulated and demodulated. J. M. Rueger in the "Electronic Distance Measurement". published by Springer-Verlag, Germany, in 1996, provides valuable introduction into this subject. This book is specifically referred to in the following discussion.

Infrared emitting and lasing diodes provide a low cost, light weight, small, low voltage and low current alternative to gas lasers. Infrared diodes can be classified according to their structure, operation, manufacturing process and direction of emission. All devices feature an active region (or laser cavity) which consists typically of undoped low-bandgap material surrounded by higher bandgap n-type (donor) and p-type (acceptor) material. In the GA Al As emitting diode under forward bias, electrons from the n-region and holes from the p-type region are injected into the active region. The confinement of these carriers to the active region is achieved by the energy barriers and refractive index steps at each heterojunction. This confinement leads to electron-hole recombination in the active layer that generates spontaneous and incoherent infrared emission in all directions. The external quantum efficiency of such LED's (Light Emitting Diodes), namely the ratio of emitted photons to input electrical power, is only a few percent. The high refractive index of the Ga Al As semiconductor material (3.5 to 3.6) causes most of the radiation to be reflected (by total reflection) at the semiconductor/air interfaces and absorbed internally. The Ga Al As emitting diode emits wavelengths between 710 and 900 nm.

The working principles of lasing diodes are as follows. Each photon generated within the active layer can stimulate the recombination of additional electron-hole pairs to emit photons that are coherent, that is they have the same wavelength and phase. With increased injection current, the gain due to the stimulation emission can approach and then exceed the absorption losses in the active layer. The device becomes an amplifier and exhibits a narrowing of the emitted spectrum as well as an abrupt increase of radiated power (lasing). Amplification is greater parallel to the active layer.

Because of the basically linear relationship between input (injection) current and output power (radiant flux) of infrared emitting diodes (over entire operating range) and lasing diodes (specific regions below and above threshold current only), the infrared output beam can be easily directly modulated. For example, a sinusoidal variation of the drive current between 10.2 A and 11.8 A leads to a sinusoidal modulation of the output power between 0.2 W and 0.75 W.

The direct demodulation can be performed by utilizing photodiodes that have the property of transforming radiation into electrical current: the higher the radiation power, the higher the current flow through the diode. The silicon (PIN) photodiodes or Si-avalanche photodiodes (APD) can be used for the purpose of direct demodulation of the modulated laser beam.

The indirect modulation may be achieved by passing a continuous light beam through two polaroid filters of perpendicular polarization planes. Between the two filters the plane of the polarized light can be rotated by a Kerr cell in phase with a modulation signal. This results in an amplitude modulated light beam emerging from the second filter. Photomultiplier can achieve the conversion of light into electric current and can be used for the indirect demodulation.

The reflected laser beam can be also used to transmit the three-dimensional positional information of the mobile unit at the time of illumination by the rotating and scanning laser beam to the signal system. In one embodiment, the angular coordinates of the mobile unit at the time of the illumination by the rotating and scanning laser beam can be determined by using two conventional rotary encoders. One such encoder (60) is shown in FIG. 3. The encoder (60) employs a conventional light emitting diode/photodetector combination as described below. The encoder (60), as shown in FIG. 3A, includes a shaft (68) and an output terminal (72). The rotary encoder of FIGS. 3 and 3A is manufactured by Dynamics Research Corporation.

In typical operation, the shaft (68) is attached to a device (not shown) of which it is desired to measure the rotational motion. In response to rotation of the device attached to shaft (68), output signals are generated via the output terminal (72) indicative of the motion. As known by those skilled in the art, to track this rotary motion, a disk internal to the rotary encoder (60) is provided. A typical disk (66) is shown in FIG. 3. The disk (66) is attached to the shaft (68) of the encoder so that it rotates with the shaft (68). The disk (66) is typically glass engraved via conventional IC lithography technique to include a plurality of lines (62) and (64). The arrows indicate that the lines (62) and (64) extend entirely around the circumference of the disk (66). A light emitting diode (not shown) is arranged on one side of the disk (66) and a photodetector (also not shown) is positioned on the other side. The light emitting diode/photodetector combination is fixed and does not rotate with the disk (66). As the device attached to the shaft (68) is rotated, the disk (66) also rotates and the lines (62) successively pass between the light emitting diode and photodetector inducing output signals indicative of the passing lines. Each line is equivalent to one cycle. With regard to the encoder shown in FIG. 3A, a disk of 3.5 inches in diameter can be used. Although disks can be provided with a various number of lines, the maximum number of lines available for this size and type of rotary encoder is in the range of 9000 lines (the lines (62) and (64) of FIG. 3 not being to scale). This is also referred to as the "count" of the encoder and results in a maximum of 9000 cycles per shaft revolution.

FIG. 4 shows the typical outputs for the rotary encoder (60) of FIGS. 3 and 3A. Although various output configurations can be provided, channels A and B (as well as their complementary channels) provide the primary outputs of the encoder (60) and can alternatively be generated in a sine wave form. Output A is generated by the lines (62) in FIG. 3 as described above. Output B is generated by a second light emitting diode/photodetector combination sensing a second set of lines (64) shown in FIG. 3. This second set of lines (64) is identical to the first set of lines (62) except that it is 90 degrees out of phase from the first set of lines (62). Accordingly, output B is simply output A shifted by 90 degrees or a quadrature wave form of output A. By having two output wave forms of the same frequency which are 90 degrees out of phase, it is possible to determine the direction of motion of the disk (66). and, therefore, the device attached to disk (66). This is conventionally accomplished by providing the A and B signals as the "D" and "CLOCK" inputs, respectively, of a D flip-flop. As a result, if the Q output line is high, the disk is being rotated counterclockwise. Since the output on channels A and B provide 9000 cycles per shaft revolution, one cycle can be provided every 0.04 degree of rotation.

As known by those skilled in the art, internal and/or external cycle interpolation can be added to increase the number of counts per revolution. With regard to the specific rotary encoder shown in FIG. 3A, for example, so-called external four times circuitry can be added to provide 36,000 counts per revolution, and internal ten times circuitry and external four times circuitry can be added to provide 360,000 counts per revolution. This type of circuitry, which can conventionally be added to any type of encoder, adds considerable expense and complexity to the encoder.

Referring still to FIG. 2, the first encoder of the type described as the encoder (60) of FIG. 3 can be used for measuring the horizontal angular coordinate of the mobile unit (36), and the second encoder of the type described as the encoder (60) of FIG. 3 can be used for measuring the vertical angular coordinate of the mobile unit (36). In this embodiment, the shaft (68) of the first encoder is attached to the rotating means of the laser beacon, wherein the shaft of the second encoder is attached to the scanning means of the laser beacon. The laser beacon provides the rotating and scanning laser beam that passes the lines (62) of each encoder in one direction, wherein the reflected from the mobile unit laser beam passes the lines (62) of each encoder in the other direction and can be detected by the photodetector. As was described above, the photodetector output signals are indicative of the passing lines. For each encoder, each line is equivalent to one cycle. Thus, both encoders can be used to provide the vertical and horizontal angular coordinates of the mobile unit at the time of illumination by the rotating and scanning laser beam respectively.

The distance between the laser beacon and the mobile unit at the time of illumination can be determined by the simple computation. Indeed, if the clock of the intelligent reflector (IR) gives the timing information at the time of illumination that is transferred back to the signal system as was discussed above, than having another clock at the laser beacon one can determine the time period that laser beam spent traveling between laser beacon and the mobile unit back and forth. Dividing this time period by two and multiplying by the speed of light, one can determine the distance between the laser beacon and each mobile unit being illuminated.

For relative measurements in the horizontal plane, there is no need for initialization. However, for absolute measurement in the horizontal plane, the user has to initialize measurement to tie the reference horizontal angle to the measured angular coordinate of each mobile unit. In the vertical plane there is no need for initialization. However, the user should calibrate the laser beam to get a reference point in order to get rid of the system errors.

The signal system (40) of FIG. 2 is shown in more detail in FIG. 5. The signal system (40) includes a second communication system (92) including a transmitter (80) and a receiver (86), a memory (82), a processor (84), a clock (81), a horizontal encoder (88), and a vertical encoder (90). The signal processor (84) utilizes the data provided by optical encoders (88) and (90), clock (81) and the time of illumination to calculate the three-dimensional coordinates for each mobile unit. The signal processor (84) further matches the positional information for each mobile unit with the ID and the time of illumination. The signal system (40) of FIG. 5 transmits the three dimensional positional data to each mobile unit using the second communication system (92).

In one embodiment, the second communication system can include a laser system used to generate a modulation signal that modulates the rotating and scanning laser beam to transmit the positional information to each mobile unit. In this embodiment, each mobile unit can use the described above intelligent reflector to demodulate the positional data from the rotating laser beam during the next sweep when the laser beam is reflected again from each mobile unit.

In another embodiment, the second communication system can include a radio communication system used to transmit the positional information to each mobile unit. In this embodiment, each mobile unit should include a radio receiver (48 of FIG. 2A) capable of receiving the positional data transmitted from the signal system.

In one embodiment, as shown in FIG. 6, each mobile unit (36) further includes at least three intelligent laser reflectors (102, 104, and 106). In this embodiment, one intelligent reflector can be used to determine a heading angular coordinate of the mobile unit. The second intelligent reflector is used to determine a pitch angular coordinate of the mobile unit, and the third intelligent reflector can be used to determine a roll angular coordinate of the mobile unit. Thus, in this embodiment, the signal system transmits to each mobile unit its attitude positional information including the heading, the pitch and the roll angular information.

The three dimensional laser control and tracking system can be used in several modes. In one mode of operation, the user uses the laser beacon to generate a rotating beam of laser light capable of covering a three-dimensional site area. Each mobile unit equipped with intelligent reflector detects and provides its identification number (ID) and the time of illumination to a signal system. After receiving the ID and the time of illumination of each mobile unit, the signal system generates the positional information for each mobile unit, matches the positional information, ID, and the time of illumination for each mobile unit, and communicates the positional information to each mobile unit. In this mode of operation, the signal system using the laser beacon can determine the three dimensional positional information with millimeter accuracy for each mobile unit and transmit this information to each mobile unit having ID, equipped with the intelligent laser reflector, and located in the area of coverage.

In another mode of operation, the signal system using the laser beacon can determine the three dimensional positional information for each mobile unit located in the area of coverage with millimeter accuracy, can transmit this information to each mobile unit having ID, equipped with the intelligent laser reflector, and located in the area of coverage, and can update this positional information with (5–20) Hz repetition rate.

Yet, in one more mode of operation, the mobile unit having at least one intelligent laser reflector and having an identification number (ID) can determine its three dimensional position coordinates by reflecting a rotating laser beam, communicating its identification number (ID) and the time of illumination to a processing unit, and by receiving the three dimensional positional information from the processing unit. The mobile unit can also update its positional information with (5–20) Hz repetition rate.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for obtaining three dimensional positional information by a mobile unit employing a three dimensional laser system; said three dimensional multi-unit laser control and tracking system comprising: a light beacon generating a rotating and scanning beam of laser light to cover a three-dimensional site area; said rotating and scanning beam of laser light being rotated and scanned in accordance with a set of predetermined rotating and scanning data; and at least one mobile unit located in said three-dimensional site area; each said mobile unit having an identification number (ID); each said mobile unit being illuminated by said rotating and scanning beam of laser light; each said mobile unit being capable of providing its identification number (ID) upon sensing and reflecting said rotating and scanning beam of laser light; each said mobile unit further including an intelligent reflector (IR) including: a laser reflector; a memory chip, said memory chip including said ID of said mobile unit; a clock; a processor; and a first communication system; wherein said processor using said clock is capable of determining an exact time instance when said rotating and scanning laser beam illuminated said intelligent reflector; and wherein said first communication system transmits said ID of said mobile unit and said exact timing data describing when said rotating and scanning laser beam, illuminated said intelligent reflector back to said light beacon; said method comprising:

(a) reflecting a rotating laser beam;

(b) determining an exact time of illumination by said laser beam;

(c) transmitting said identification number (ID) and said exact time of illumination to a signal system;

(d) using a first encoder for measuring a horizontal angular coordinate of said mobile unit;

(e) using a second encoder for measuring a vertical angular coordinate of said mobile unit;

(f) using a signal system clock for measuring an exact time when said reflected from said mobile unit laser beam reaches said laser beacon; wherein said signal system includes said signal system clock;

(g) determining a distance between said laser beacon and said one mobile unit at the time when said one mobile unit is illuminated by said laser beam; said distance being equal to a traveling time period divided by two and multiplied by the speed of light; wherein said traveling time period comprises a time period that laser beam spent traveling between said laser beacon and said mobile unit back and forth; wherein said traveling time period is equal to the time difference between said exact time when said laser beam reaches said laser beacon and said exact time of illumination of said mobile unit by said laser beam that is transferred back to said signal system;

(h) generating a set of three dimensional data by said signal system by processing said horizontal angular coordinate of said mobile unit; said vertical angular coordinate of said mobile unit; and said distance between the laser beacon and the mobile unit at the time said one mobile unit is illuminated;

(i) transmitting said set of three dimensional positional data from said signal system to said one mobile unit; and (k) receiving by said one mobile unit said set of three dimensional positional data generated and transmitted by said signal system.

2. The method of claim 1 further including the step of:

(e) repeating the steps (a–d) to update said set of positional data.

3. A system for control and tracking at least one mobile unit employing a three-dimensional laser system, said system comprising:

a means for generating a rotating beam of laser light capable of covering a three-dimensional site area;

a means for detecting said laser beam being sequentially reflected from each said mobile unit, each said mobile unit having at least one intelligent laser reflector and having an identification number (ID), each said mobile unit being capable to determine an exact time when said mobile unit was illuminated by said laser beam;

a means for receiving an ID coupled with an exact time of illumination from each said mobile unit;

a means for generating a set of positional data coupled with an ID number for each said mobile unit; and a means for communicating said set of positional data to each said mobile unit.

4. A system for providing and updating the positional information for at least one mobile unit employing a three dimensional laser system, said system comprising:

(a) a means for generating a rotating beam of laser light capable of covering a three-dimensional site area;

(b) a means for detecting said laser beam being sequentially reflected from each said mobile unit, each said mobile unit having at least one intelligent laser reflector and having an identification number (ID), each said mobile unit being capable to determine an exact time when said mobile unit was illuminated by said laser beam;

(c) a means for receiving an ID coupled with an exact time of illumination from each said mobile unit;

(d) a means for generating a set of positional data coupled with an ID number for each said mobile unit; and (e) a means for communicating said set of positional data to each said mobile unit.

* * * * *